(12) United States Patent
Kawasaki et al.

(10) Patent No.: US 6,416,852 B1
(45) Date of Patent: Jul. 9, 2002

(54) CERAMICS SOUND ABSORPTION MATERIAL

(75) Inventors: Hidenao Kawasaki; Osamu Kawasaki, both of Toyokawa (JP)

(73) Assignee: Isolite Insulating Products Co., Ltd. (JP)

(*) Notice: Subject to any disclaimer, the term of this patent is extended or adjusted under 35 U.S.C. 154(b) by 0 days.

(21) Appl. No.: 09/511,745

(22) Filed: Feb. 24, 2000

(30) Foreign Application Priority Data

Nov. 17, 1999 (JP) .......................................... 11-326605

(51) Int. Cl.$^7$ ............................. B23B 3/00; B23B 3/26; B23B 3/06
(52) U.S. Cl. .................... 428/304.4; 428/219; 428/210; 428/307.3
(58) Field of Search .......................... 428/304.4, 307.3, 428/313.9, 219; 181/210, 286, 293

(56) References Cited

U.S. PATENT DOCUMENTS

| | | | | |
|---|---|---|---|---|
| 3,568,723 A | * | 3/1971 | Sowards | 138/143 |
| 3,771,592 A | * | 11/1973 | Sayers | 165/10 |
| 4,352,853 A | * | 10/1982 | Uchikawa et al. | 428/304.4 |
| 4,371,581 A | * | 2/1983 | Uchikawa et al. | 181/204 |
| 4,472,332 A | * | 9/1984 | Fukushima et al. | 264/44 |
| 4,481,124 A | * | 11/1984 | Koga et al. | 252/62 |
| 4,732,593 A | * | 3/1988 | Kondo et al. | 55/523 |
| 4,822,541 A | * | 4/1989 | Nagai et al. | 264/235 |
| 4,954,460 A | * | 9/1990 | Tanemura et al. | 501/80 |
| 4,975,098 A | * | 12/1990 | Lee et al. | 48/192 |
| 5,025,888 A | * | 6/1991 | Arcas et al. | 181/213 |
| 5,234,048 A | * | 8/1993 | Seike et al. | 165/9 |
| 5,504,281 A | * | 4/1996 | Whitney et al. | 181/286 |
| 5,678,364 A | * | 10/1997 | Shima et al. | 52/169.3 |
| 5,820,975 A | * | 10/1998 | Oda et al. | 428/219 |
| 5,854,453 A | * | 12/1998 | Fujiwara et al. | 181/293 |
| 5,966,885 A | * | 10/1999 | Chatelain | 52/309.4 |
| 5,971,096 A | * | 10/1999 | Matsumoto et al. | 181/210 |
| 6,057,030 A | * | 5/2000 | Mano | 428/307.7 |

FOREIGN PATENT DOCUMENTS

| | | | | | |
|---|---|---|---|---|---|
| JP | 1-165848 A | * | 6/1989 | | 428/219 |
| JP | 3-119236 A | * | 5/1991 | | 427/201 |
| JP | 8-146967 A | * | 6/1996 | | 428/219 |
| JP | 2001-140380 A | * | 5/2001 | | |

* cited by examiner

*Primary Examiner*—Tom Dunn
*Assistant Examiner*—L. Edmondson
(74) *Attorney, Agent, or Firm*—Wall Marjama & Bilinski LLP

(57) ABSTRACT

A ceramics sound absorption material made of a ceramics block which is obtained by adding a combustible pore-forming material to at least one selected from refractory clay and refractory chamotte and calcining the blend, which has communicating pores having a main pore diameter of 0.2 to 2,000 μm, which has an air permeability of at least 1 cm$^3$·cm/cm$^2$·sec·cmH$_2$O, and in which surface a large number of sound absorption holes or sound absorption grooves are formed, a glaze being applied to only the surface except the inner peripheral surfaces and the bottom surfaces of the sound absorption holes or the sound absorption grooves to form a glaze layer which fills the communicating pores and which is substantially free from an air permeability. The porous ceramics sound absorption material is excellent in sound absorption characteristics and a weatherability, and is less stained in particular. Stains once adhered are easily removed, and a good appearance can be maintained for a long period of time.

11 Claims, 4 Drawing Sheets

CERAMICS SOUND ABSORPTION MATERIAL

BACKGROUND OF THE INVENTION

1. Field of the Invention

The present invention relates to a ceramics sound absorption material which is excellent in a weatherability, of which the surface is less stained and which is appropriate as a sound barrier of roads or railroads.

2. Description of the Related Art

Sound absorption materials have been so far typically mineral fiber sound absorption materials such as glass wool and rock wool. However, mineral fiber sound absorption materials have suffered drawbacks that a sound absorption property is notably decreased when absorbing a moisture and that since materials are made of fibers, they are deformed over the course of time or easily scattered or peeled off by a high-speed air current.

Further, a sound absorption material in which a large number of penetrated holes are formed in a gypsum board is well known. In the sound absorption material made of the gypsum board having the penetrated holes, a sound energy is absorbed by resonance in the penetrated holes. However, it has involved a drawback that sound absorption can be conducted only at a specific frequency. In order to eliminate this drawback, an air layer is formed on the back or a liner such as glass wool is formed on the back surface. However, these methods have required much labor.

Recently, ceramics or cement sound absorption materials have been developed which can be used outdoors because of an excellent weatherability and which have a heat insulation effect with an incombustibility. For example, Japanese Patent Laid-Open No.110692/1995 proposes a sound absorption material in which a large number of non-penetrated holes are formed in porous ceramics. The sound absorption material made of porous ceramics has, however, numerous fine communicating pores in the surface. When this material is used outdoors, it is easily stained, and stains once adhered thereto are hardly removed.

Meanwhile, Japanese Patent Laid-Open No. 27504/1974 discloses that a surface strength is improved by applying a glaze to the overall surface of porous ceramics for sound absorption. Nevertheless, this glaze layer is applied to the overall surface, so that when communicating pores are filled therewith, an air permeability required for sound absorption cannot be secured. Then, for communicating pores to remain, a glaze is permeated from the surface to the tissue of the porous ceramics. As a result, fine raised and depressed portions are left on the surface owing to the communicating pores, whereby stains also tend to be adhered, and it is difficult to remove stains once adhered.

SUMMARY OF THE INVENTION

Under these circumstances, the invention aims to provide a porous ceramics sound absorption material which has excellent sound absorption characteristics in a wide frequency region, which has an excellent weatherability and is less stained in particular, from which stains once adhered are easily removed, and which can maintain a good appearance for a long period of time.

The aim of the invention can be achieved by a ceramics sound absorption material comprising a ceramics block which is obtained by adding a combustible pore-forming material to at least one selected from refractory clay and refractory chamotte and calcining the blend, which has communicating pores having a main pore diameter of 0.2 to 2,000 $\mu$m, which has an air permeability of at least 1 $cm^3 \cdot cm/cm^2 \cdot sec \cdot cmH_2O$, and in which surface a large number of sound absorption holes or sound absorption grooves are formed, a glaze being applied to only the surface except the inner peripheral surfaces and the bottom surfaces of the sound absorption holes or the sound absorption grooves to form a glaze layer which fills the communicating pores and which is substantially free from an air permeability.

DETAILED DESCRIPTION OF THE INVENTION

Figure 1:
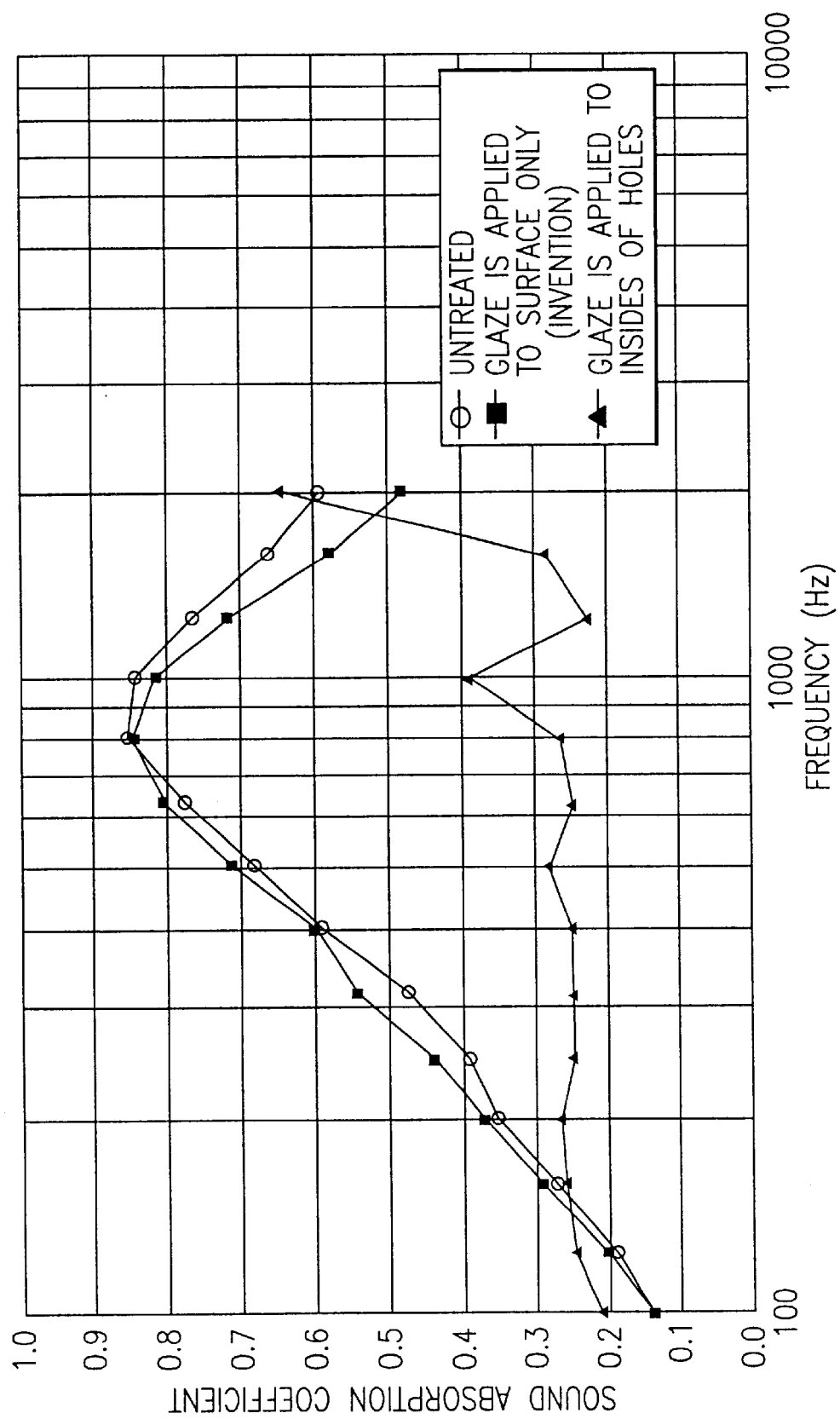
FIG. 1 is a graph showing a sound absorption coefficient of each ceramics sound absorption material in Example 1.

In the ceramics sound absorption material of the invention, the sound absorption holes or the sound absorption grooves are further formed in the surface of the porous ceramics block, and the glaze layer is formed in the remaining surface except the sound absorption holes or the sound absorption grooves. This glaze layer fills the communicating pores in the surface of the ceramics block, whereby the surface is less stained, and stains once adhered are easily removed. At the same time, the ceramics sound absorption material of the invention exhibits the excellent sound absorption property by the sound absorption holes or the sound absorption grooves to which the glaze is not applied.

The ceramics block used in the invention is obtained by adding a pore-forming material to refractory clay and/or refractory chamotte to form a slurry or a clay paste, casting or extrusion-molding the same and conduct calcination. The pore-forming material is a material which is burned in the calcination to form pores, and foamed polystyrene particles having a particle diameter of approximately 0.5 to 2 mm or wood dust such as sawdust is available. When foamed polystyrene particles are used, it is advisable to simultaneously incorporate bubbles obtained by mixing refractory clay or refractory chamotte with a surfactant. Further, the calcination temperature is 1,000 or more, preferably between 1,200 and 1,700° C.

The ceramics block obtained by such a method is a porous block with communicating pores having a main pore diameter of 0.2 to 2,000 $\mu$m. The air permeability of this porous ceramics block can vary with the type, the shape, the particle size, the particle size distribution and the calcination conditions of the pore-forming material mixed with refractory clay or refractory chamotte. When the air permeability reaches at least 1 $cm^3 \cdot cm/cm^2 \cdot sec \cdot cmH_2O$, the sound absorption property is provided by ceramics per se.

In the ceramics block used in the invention, a large number of penetrated or non-penetrated sound absorption holes or penetrated or non-penetrated sound absorption grooves (non-penetrated grooves when sound absorption grooves are formed longitudinally and transversely) are formed in one surface vertical to the thickness direction of the above-obtained ceramics block. By the way, either of the sound absorption holes or the sound absorption grooves are usually formed, but it is also possible to form a combination of two or more types, such as non-penetrated sound absorption holes and penetrated sound absorption holes, or non-penetrated sound absorption holes and non-penetrated sound absorption grooves.

In the ceramics block having formed therein sound absorption holes or sound absorption grooves, a glaze is applied to the surface only to form, on the surface, a glaze layer which fills the communicating pores of the ceramics block and which is substantially free from an air permeability. A method of applying a glaze is preferably dipping by which a glaze is applied to the surface only without being adhered to the inner peripheral surfaces or the bottom surfaces of the sound absorption holes or grooves formed. In case of spraying, care must be taken not to adhere the glaze to the inner peripheral surfaces or the bottom surfaces of the sound absorption holes or grooves. When the glaze is adhered to the inner peripheral surfaces or the bottom surfaces of the sound absorption holes or grooves, the air permeability through the sound absorption holes or grooves is decreased, and the sound absorption property is also decreased accordingly, though it depends on the surface area filled with the glaze layer.

When the thermal expansion difference between the glaze used and the porous ceramics block as a substrate is great, there is a risk of peeling off the glaze layer from the surface. Since ceramics made mainly of refractory clay contain mullite as a main mineral, the expansion coefficient is low. Accordingly, it is advisable that the thermal expansion coefficient of the glaze is in the range of 4.5 to $5 \times 10^{-6}$/K to comply with this expansion coefficient. Specifically, a glaze containing $SiO_2$, $Al_2O_3$, ZnO, CaO, $K_2O$, $Na_2O$ and $Li_2O$ in which the amounts of the ingredients are controlled to set the thermal expansion coefficient in this range is preferable. Further, in application of the glaze by dipping, it is advisable that the thickness of the glaze adhered is controlled with the dipping time by adding an organic glue such as CMC according to a water absorption ability of a ceramics block.

It is considered that since the sound absorption mechanism of the ceramics sound absorption material having the glaze layer on the surface in the invention has the sound absorption holes or the sound absorption grooves to which the glaze is not applied, an area is generated which acts as a back air layer inside the ceramics block having the air permeability through the sound absorption holes or the sound absorption grooves and the back air layer within the ceramics block is resonated with a wide-ranging frequency zone to be able to maintain the excellent sound absorption property.

In the invention, the air permeability of the ceramics block itself has to be at least 1 $cm^3 \cdot cm/cm^2 \cdot sec \cdot cmH_2O$, and it is preferably at least 2 $cm^3 \cdot cm/cm^2 \cdot sec \cdot cmH_2O$ in view of the sound absorption property after application of the glaze. Nevertheless, when the air permeability of the ceramics block is great, the strength of the ceramics block is decreased, and the unevenness of the surface is increased, so that a large amount of the glaze is required. For this reason, the upper limit of the air permeability is preferably 20 $cm^3 \cdot cm/cm^2 \cdot sec \cdot cmH_2O$, more preferably 8 $cm^3 \cdot cm/cm^2 \cdot sec \cdot cmH_2O$.

With respect to the sound absorption hole, it is advisable that the diameter is between 5 and 15 mm and the opening ratio is between 5 and 30%. Further, with respect to the sound absorption groove, it is advisable that the groove width is between 2 and 20 mm and the opening ratio is between 9 and 40%. When the opening ratios are outside these ranges, the sound absorption coefficient of the ceramics block itself before applying the glaze is low, and the sound absorption coefficient of the ceramics sound absorption material after applying the glaze in the invention is also unsatisfactory. When the diameter of the sound absorption hole is less than 5 mm and the groove width of the sound absorption groove is less than 2 mm, the stable processing is difficult, and the glaze tends to remain in film form on the opening portion of the hole or the groove in applying the glaze through the dipping. Further, when the diameter exceeds 15 mm and the groove width exceeds 20 mm, the ceramics block is liable to break in the processing.

Moreover, when the depth of the non-penetrated sound absorption hole or groove is less than the thickness of the ceramics block, it can optionally be determined. Specifically, in case of a ceramics block having a thickness of 25 mm or more, it is preferable that a depth of a non-penetrated sound absorption hole or groove is 20 mm or more.

Thus, in the ceramics sound absorption material of the invention, the glaze layer is formed on the remaining surface of the porous ceramics block except the sound absorption holes or grooves. Accordingly, it is possible that the communicating pores in the surface of the ceramics block are filled with the glaze layer, the surface is less stained and stains once adhered can easily be removed through cleaning. In addition, since the sound absorption holes or grooves free of the glaze remain in the surface, the excellent sound absorption property which is almost the same as that before applying the glaze can be exhibited.

Thus, the invention can provide the porous ceramics sound absorption material which has excellent sound absorption characteristics, which is excellent in the weatherability, which is less stained in particular, from which stains once adhered are easily removed, and which can maintain a good appearance for a long period of time.

In the invention, the sound absorption coefficient was measured by a normal incident sound absorption coefficient measuring method of building materials according to the JIS A 1405 pipe method. Further, the air permeability of the ceramics block was measured according to JIS R 2115, and indicated in terms of a value given without applying a viscoelasticity of air.

EXAMPLES

Example 1

Sawdust as a pore-forming material and water were added to refractory clay and refractory chamotte to form a clay paste. This was extrusion-molded, dried, and then calcined at 1,300° C. to produce a ceramics block having a main pore diameter of 0.2 to 2,000 μm, a bulk specific gravity of 0.80, a porosity of 70%, an air permeability of 2.6 $cm^3 \cdot cm/cm^2 \cdot sec \cdot cmH_2O$ and a thickness of 65 mm. This block was cut to form a sample (diameter 91.6 mm) for measuring a normal incident sound absorption coefficient. Twelve non-penetrated sound absorption holes having a diameter of 8 mm and a hole depth of 40 mm were formed in its surface almost regularly, and the opening ratio was set at 9.2%.

Subsequently, a glaze comprising 55% by weight of $SiO_2$, 20% by weight of $Al_2O_3$, 10% by weight of ZnO, 8% by weight of CaO, 2% by weight of $K_2O$, 2% by weight of $Na_2O$ and 2% by weight of $Li_2O$ was applied to the sound absorption surface of the ceramics block sample having the sound absorption holes through dipping, and was calcined at 1,100° C. to form approximately 8.2 g of a smooth glaze layer on the surface except the inner peripheral surfaces and the bottom surfaces of the sound absorption holes.

The normal incident sound absorption coefficient of the resulting ceramics sound absorption material was measured, and the results are shown in FIG. 1. Further, FIG. 1 shows the sound absorption coefficient of the ceramics blocks having the same sound absorption holes before application of the glaze and the sound absorption coefficient when the glaze is applied to the insides of the sound absorption holes. As is apparent from this FIG. 1, in the sound absorption material of the invention, the sound absorption coefficient is somewhat decreased above the peak frequency, but the sound absorption coefficient is improved below the peak frequency, and is unchanged at the sound absorption peak, making it possible to maintain the high sound absorption property. When the glaze is applied to the insides of the sound absorption holes, the sound absorption property is found to be notably decreased.

Example 2

Six non-penetrated sound absorption holes having a diameter of 12 mm and a hole depth of 25 mm and six non-penetrated sound absorption holes having a diameter of 12 mm and a hole depth of 60 mm were formed almost regularly in the same sample of the ceramics block as that used in Example 1, and the opening ratio was set at 20.7%. The same glaze as that used in Example 1 was applied to the sound absorption surface of this sample through dipping, and calcined at 1,100° C. to form 6.5 g of a smooth glaze layer on the surface except the inner peripheral surfaces and the bottom surfaces of the sound absorption holes.

Figure 2:
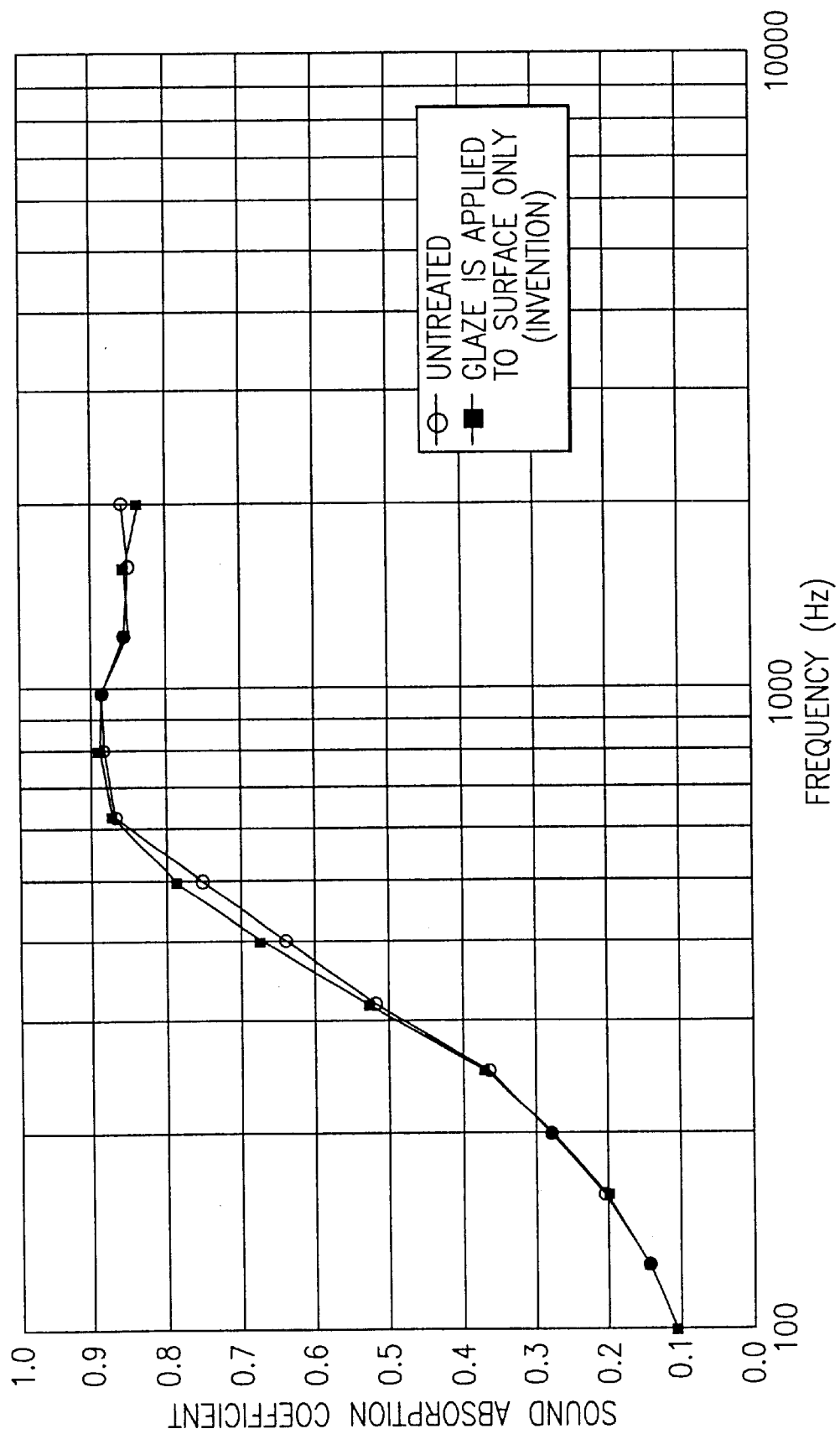
FIG. 2 is a graph showing a sound absorption coefficient of each ceramics sound absorption material in Example 2.

The normal incident sound absorption coefficient of the resulting ceramics sound absorption material is shown in FIG. 2 along with the sound absorption coefficient of the ceramics block having the sound absorption holes before application of the glaze. The decrease in the sound absorption property is not observed before or after application of the glaze, and the high sound absorption property can be obtained.

Example 3

Foamed polystyrene beads as a pore-forming agent and bubbles formed from water and a surfactant were added to refractory clay and refractory chamotte to form a slurry. The slurry was cast, dried, and then calcined at 1,300° C. to produce a ceramics block having a main pore diameter of 0.2 to 2,000 $\mu$m, a bulk specific gravity of 0.52, a porosity of 80%, an air permeability of 7.7 cm$^3$·cm/cm$^2$·sec·cmH$_2$O and a thickness of 65 mm.

This ceramics block was cut to form a sample (diameter 91.6 mm) for measuring a normal incident sound absorption coefficient. Two sound absorption holes having a diameter of 12 mm and a depth of 25 mm, eight sound absorption holes having a depth of 45 mm and two penetrated holes were formed in its surface almost regularly, and the opening ratio was set at 20.7%.

Subsequently, the same glaze as that used in Example 1 was applied to the sound absorption surface of the ceramics block sample having the sound absorption holes, and calcined at 1,100° C. to form 7.0 g of a smooth glaze layer on the surface except the inner peripheral surfaces and the bottom surfaces of the sound absorption holes.

Figure 3:
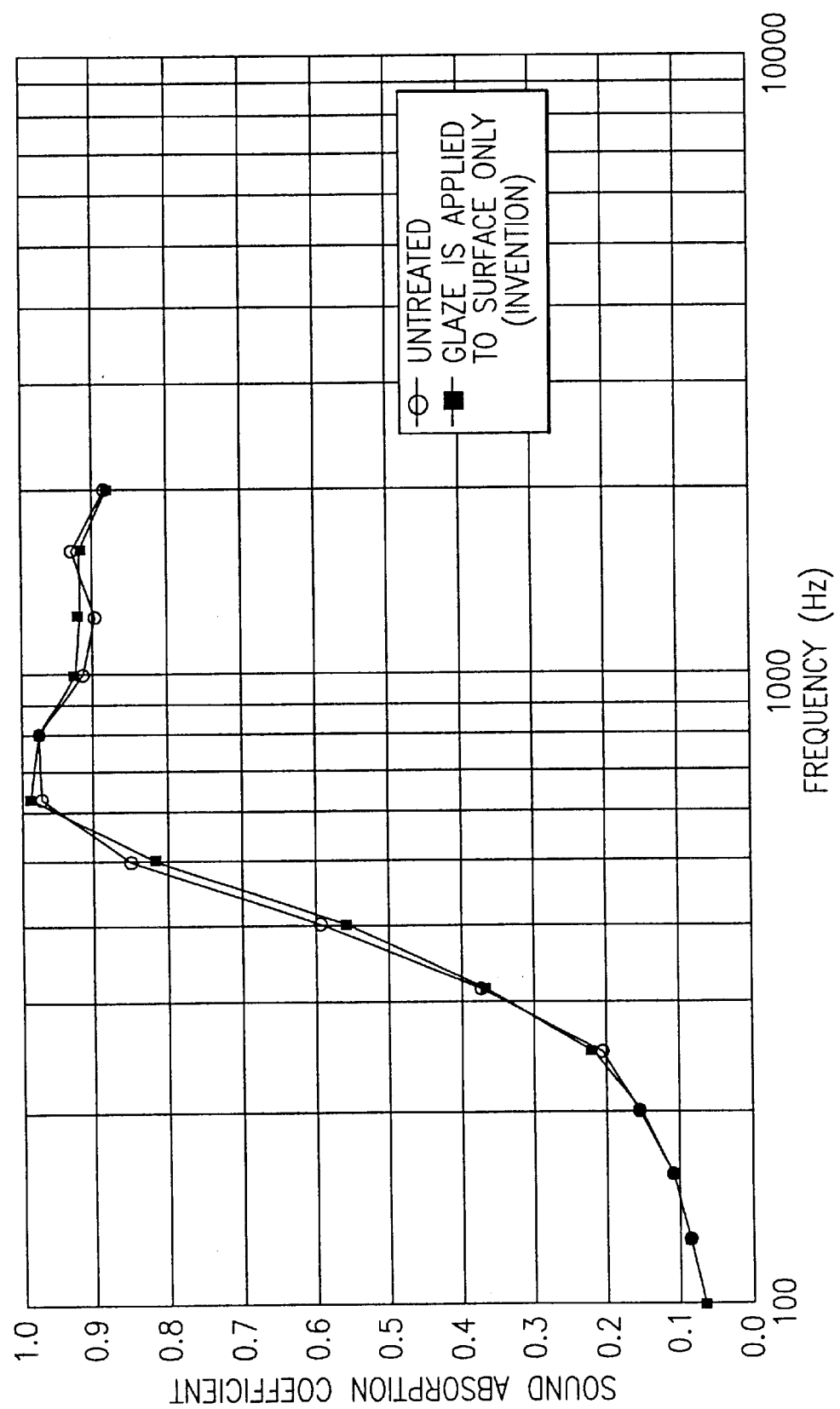
FIG. 3 is a graph showing a sound absorption coefficient of each ceramics sound absorption material in Example 3.

The normal incident sound absorption coefficient of the resulting ceramics sound absorption material is shown in FIG. 3 along with the sound absorption coefficient of the ceramics block having the sound absorption holes before application of the glaze. The decrease in the sound absorption property is not observed before or after application of the glaze, and the high sound absorption property can be obtained.

Example 4

Grooves having a width of 9.4 mm and a depth of 40 mm were regularly formed in the same sample of the ceramics block as that used in Example 1 at a pitch of 20 mm, and the opening ratio was set at 43%. The same glaze as that used in Example 1 was applied to the sound absorption surface of the sample through dipping, and calcined at 1,100° C. to form 5.0 g of a smooth glaze layer on the surface except the side surfaces and the bottom surfaces of the sound absorption grooves.

Figure 4:
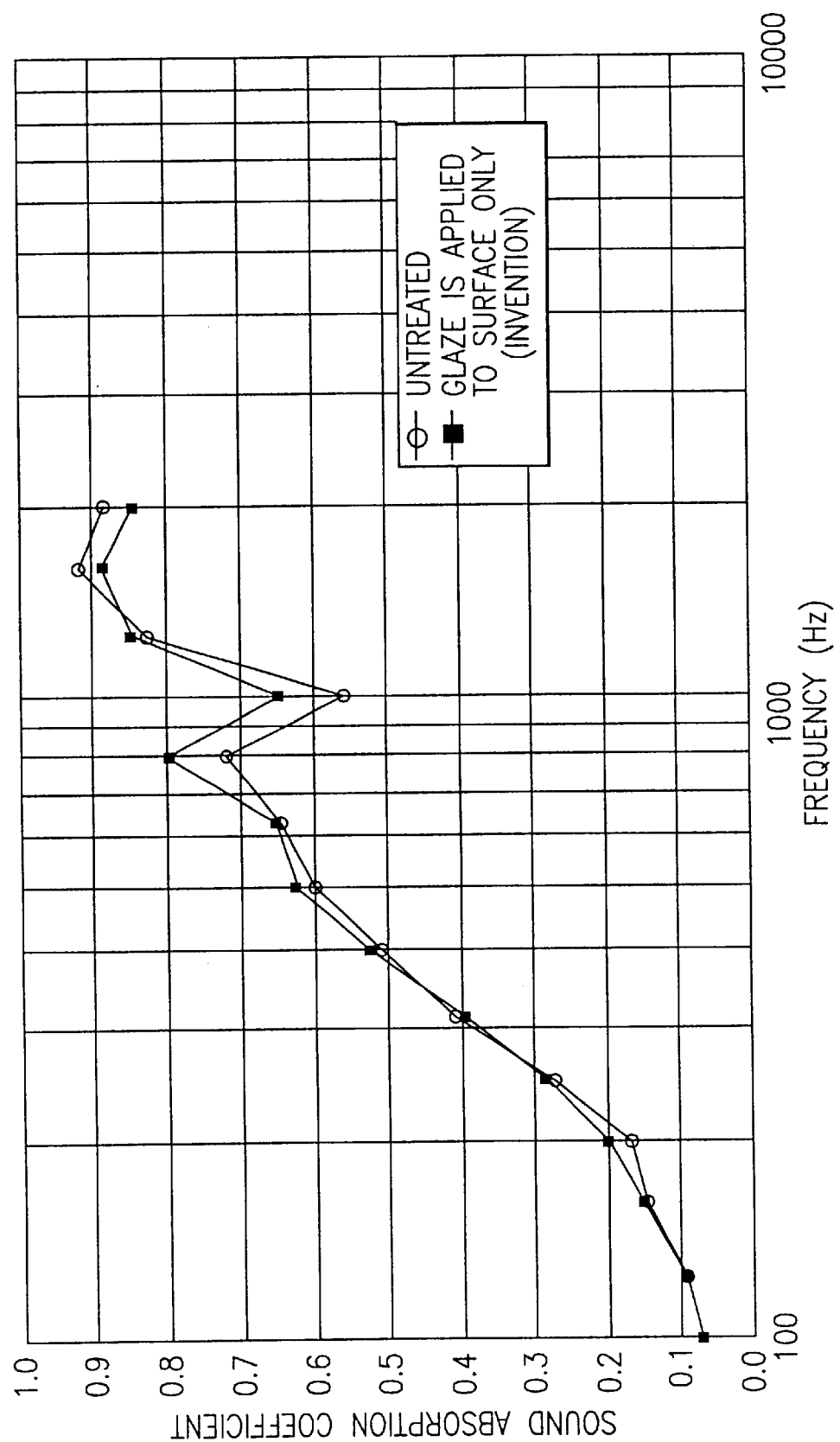
FIG. 4 is a graph showing a sound absorption coefficient of each ceramics sound absorption material in Example 4.

The normal incident sound absorption coefficient of the resulting ceramics sound absorption material is shown in FIG. 4 along with the sound absorption coefficient of the ceramics block having the sound absorption grooves before application of the glaze. The decrease in the sound absorption property is not observed before or after application of the glaze, and the high sound absorption property can be obtained.

What is claimed is:

1. A stain resistant ceramic sound absorption material obtained by steps comprising:

calcining a blend of a refractory material and a combustible pore-forming material to obtain an air-permeable substrate having communicating pores with pore diameters of 0.2 to 2,000 $\mu$m and an air permeability of at least 1 cm$^3$·cm/cm$^2$·sec·cmH$_2$O and non-communicating sound absorbing holes and grooves;

applying a glaze to said air-permeable substrate wherein said glaze covers top surface of said air-permeable substrate to fill said communicating pores and wherein said non-communicating holes and grooves remain unfilled and further said glaze is substantially free from air permeability and provides for a surface which is resistant to staining.

2. The ceramic sound absorption material of claim 1, wherein refractory material is refractory clay.

3. The ceramic sound absorption material of claim 1, wherein said refractory material is refractory chamotte.

4. The ceramic sound absorption material of claim 1, wherein said combustible pore-forming material contains foamed polystyrene particles with the particle size being about 0.5 to 2 mm.

5. A ceramic sound absorption material of claim 1, wherein said combustible pore-forming material is wood saw dust having a particle size around 0.5 to 2 mm.

6. The ceramic sound absorption material of claim 1, wherein the air-permeability of said air-permeable substrate is between 5 cm$^3$·cm/cm$^2$·sec·cmH$_2$O and 8 cm$^3$·cm/cm$^2$·sec·cmH$_2$O.

7. The ceramic sound absorption material of claim 1, wherein said glaze has a thermal expansion coefficient of about 4.5–5×10$^{-6}$K$^{-1}$.

8. The ceramic sound absorption material of claim 1, wherein said glaze comprises SiO$_2$, Al$_2$O$_3$, ZnO, CaO, K$_2$O, Na$_2$O,Li$_2$O.

9. The ceramic sound absorption material of claim 1 wherein said non-communicating holes have a diameter of between 5–15 mm and an opening ratio of 9 to 40%.

10. The ceramic sound absorption material of claim 1 wherein said non-communicating grooves have a groove width of about 2–20 mm and an opening ratio of 9 to 40%.

11. The ceramic sound absorption material of claim 1 wherein said non-communicating holes and grooves have interior walls that are substantially free of glaze.

* * * * *